United States Patent [19]

Uyen

[11] 4,075,543
[45] Feb. 21, 1978

[54] METHOD OF DETERMINING THE POSITION AND CONNECTION OF MULTI-POLE WINDINGS FOR MULTI-SPEED ELECTRIC MACHINES

[75] Inventor: Thuy Nguyen Uyen, Grenoble, France

[73] Assignee: Anvar Agence Nationale de Valorisation de la Recherche, France

[21] Appl. No.: 681,636

[22] Filed: Apr. 29, 1976

Related U.S. Application Data

[63] Continuation of Ser. No. 496,249, Aug. 9, 1974, abandoned.

[30] Foreign Application Priority Data

Aug. 17, 1973  France .................................. 73 30390

[51] Int. Cl.[2] .............................................. H02K 3/00
[52] U.S. Cl. .................................. 318/224 R; 310/210; 364/488
[58] Field of Search ................... 29/596; 310/198–208; 318/224 R

[56] References Cited

U.S. PATENT DOCUMENTS

| | | | |
|---|---|---|---|
| 3,686,553 | 8/1972 | Broadway et al. | 318/224 R |
| 3,794,870 | 2/1974 | Broadway et al. | 310/198 |
| 3,898,543 | 8/1975 | Broadway et al. | 318/224 R |
| 3,927,358 | 12/1975 | Broadway et al. | 318/224 R |
| 3,935,519 | 1/1976 | Pfarrer et al. | 318/224 R |

FOREIGN PATENT DOCUMENTS

| | | | |
|---|---|---|---|
| 900,600 | 7/1962 | United Kingdom. | |
| 1,240,902 | 7/1971 | United Kingdom | 310/198 |

*Primary Examiner*—Felix D. Gruber
*Attorney, Agent, or Firm*—Beveridge, De Grandi, Kline & Lunsford

[57] ABSTRACT

The invention relates to a novel method for determining the multipole windings of electric induction machines. This method is based on the operational modulation, which consists in modulating a 2p-pole basic winding by $q$ sequences of complex operators ($a^0, a^1, \ldots a^r, \ldots a^{m-1}$) wherein said operators are the $m$ $m^{th}$ roots of the unity in a m - phased system, so that the polarity of the modulated winding is $|2p \pm 2q|$. In a 3-phased system, the wiring diagram consists e.g. in 9 main branches of windings coupled into 3 main parallel coupled stars, and this diagram requires only 6 outputs and two 3-pole switches for switching from one speed to the other.

7 Claims, 35 Drawing Figures

FIG. 30

| 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|
| T | T | $\bar{S}$ | $\bar{S}$ | $\bar{S}$ | R | R | R | $\bar{T}$ | $\bar{T}$ | $\bar{T}$ | S | S | S | $\bar{R}$ | $\bar{R}$ | $\bar{R}$ |
|   |   |   |   |   | 1 | 1 | 1 |   |   |   |   |   |   | $(a^2)$ | $a^2$ | $a^2$ |
| (a) | 1 |   |   |   |   |   |   | 1 | 1 | (1) |   |   |   |   |   |   |
|   |   | (1) | 1 | 1 |   |   |   |   |   |   | 1 | (1) | $a^2$ |   |   |   |
| (Y) | Z | $(\bar{Y})$ | $\bar{Y}$ | $\bar{Y}$ | X | X | X | $\bar{Z}$ | $\bar{Z}$ | $(\bar{Z})$ | Y | (Y) | Z | $(\bar{Y})$ | $\bar{Y}$ | $\bar{Y}$ |

OPERATOR $a^2$ | OPERATOR 1 | OPERATOR $a^2$ | OPERATOR $a^2$

| 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|
| T | T | T | $\bar{S}$ | $\bar{S}$ | $\bar{S}$ | R | R | R | $\bar{T}$ | $\bar{T}$ | $\bar{T}$ | S | S | S | $\bar{R}$ | $\bar{R}$ | $\bar{R}$ | T |
|   |   |   |   |   | $a^2$ | $(a^2)$ | $a$ |   |   |   |   |   |   |   |   | $a$ | $a$ | $(a)$ |
| $a^2$ | $a^2$ | $a^2$ |   |   |   |   |   |   | (a) | $a$ | $a$ |   |   |   |   |   |   | $a$ |
|   |   |   | $a^2$ | $a^2$ | $(a^2)$ |   |   |   |   |   |   | $a$ | $a$ | $a$ |   |   |   |   |
| X | X | X | $\bar{Z}$ | $\bar{Z}$ | $(\bar{Z})$ | Y | (Y) | Z | $(\bar{Y})$ | $\bar{Y}$ | $\bar{Y}$ | X | X | X | $\bar{Z}$ | $\bar{Z}$ | $(\bar{Z})$ | Y |

FIG. 33

| 1 | 5 | 7 | 11 | 14 | 18 | 19 | 21 | 22 | 23 | 25 | 29 | 31 | 35 | 38 |
| 4 | 6 | 10 | 13 | 17 |    | 20 |    |    | 24 | 28 | 30 | 34 | 37 | 41 |
|---|---|---|---|---|---|---|---|---|---|---|---|---|---|---|
| 4 | 2 | 4 | 3 | 4 | 1 | 2 | 1 | 1 | 2 | 4 | 2 | 4 | 3 | 4 |
| X | $\bar{Z}$ | Y | $\bar{X}$ | Z | $\bar{Y}$ | X | $\bar{Z}$ | Y | $\bar{X}$ | Z | $\bar{Y}$ | X | $\bar{Z}$ | Y |
| 1 | 1 | 1 | 1 | 1 | 1 | 1 | 1 | 1 | $a$ | $a$ | $a$ | $a$ | $a$ | $a$ |
| R | $\bar{T}$ | S | $\bar{R}$ | T | $\bar{S}$ | R | $\bar{T}$ | R | $\bar{T}$ | S | $\bar{R}$ | T | $\bar{S}$ | R |
| 1 | 1 | 1 | 1 | 1 | 1 | $a$ | $a$ | $a$ | $a$ | $a$ | $a$ | $a$ | $a$ | $a$ |
| X | $\bar{Z}$ | Y | $\bar{X}$ | Z | $\bar{Y}$ | Z | $\bar{Y}$ | Z | $\bar{Y}$ | X | $\bar{Z}$ | Y | $\bar{X}$ | Z |

| 42 | 43 | 45 | 46 | 47 | 49 | 53 | 55 | 51 | 62 | 66 | 67 | 69 | 70 | 71 |
|    | 44 |    |    | 48 | 52 | 54 | 58 | 61 | 65 |    | 68 |    |    | 72 |
|---|---|---|---|---|---|---|---|---|---|---|---|---|---|---|
| 1 | 2 | 1 | 1 | 2 | 4 | 2 | 4 | 3 | 4 | 1 | 2 | 1 | 1 | 2 |
| $\bar{X}$ | Z | $\bar{Y}$ | X | $\bar{Z}$ | Y | $\bar{X}$ | Z | $\bar{Y}$ | X | $\bar{Z}$ | Y | $\bar{X}$ | Z | $\bar{Y}$ |
| $a$ | $a$ | $a$ | $a^2$ | $a^2$ | $a^2$ | $a^2$ | $a^2$ | $a^2$ | $a^2$ | $a^2$ | $a^2$ | $a^2$ | $a^2$ | $a^2$ |
| $\bar{T}$ | S | $\bar{R}$ | S | $\bar{R}$ | T | $\bar{S}$ | R | $\bar{T}$ | S | $\bar{R}$ | T | $\bar{S}$ | T | $\bar{S}$ |
| $a$ | $a^2$ | $a^2$ | $a^2$ | $a^2$ | $a^2$ | $a^2$ | $a^2$ | $a^2$ | $a^2$ | $a^2$ | 1 | 1 | 1 | 1 |
| $\bar{Y}$ | Z | $\bar{Y}$ | T | $\bar{Y}$ | X | $\bar{Z}$ | Y | $\bar{X}$ | Z | $\bar{Y}$ | Z | $\bar{Y}$ | Z | $\bar{Y}$ |

| 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|----|----|----|----|----|----|----|----|----|----|----|
| R | R | R | R | $\bar{T}$ | $\bar{T}$ | $\bar{T}$ | $\bar{T}$ | S | S | S | S | $\bar{R}$ | $\bar{R}$ | $\bar{R}$ | $\bar{R}$ | T | T | T | T |
| 1 | 1 | 1 | $-a$ | | | | | | | | | $-a$ | $-a$ | $-a$ | $a^2$ | | | | |
| | | | | 1 | 1 | $-a$ | $-a$ | | | | | | | | | $-a$ | $-a$ | $a^2$ | $a^2$ |
| | | | | | | | | 1 | $-a$ | $-a$ | $-a$ | | | | | | | | |
| X | X | X | $\bar{Z}$ | $\bar{Z}$ | $\bar{Z}$ | Y | Y | Y | $\bar{X}$ | $\bar{X}$ | $\bar{X}$ | Z | Z | Z | $\bar{Y}$ | $\bar{Y}$ | $\bar{Y}$ | X | X |

| 21 | 22 | 23 | 24 | 25 | 26 | 27 | 28 | 29 | 30 | 31 | 32 | 33 | 34 | 35 | 36 | 37 | 38 | 39 | 40 |
|----|----|----|----|----|----|----|----|----|----|----|----|----|----|----|----|----|----|----|----|
| $\bar{S}$ | $\bar{S}$ | $\bar{S}$ | $\bar{S}$ | R | R | R | R | $\bar{T}$ | $\bar{T}$ | $\bar{T}$ | $\bar{T}$ | S | S | S | S | $\bar{R}$ | $\bar{R}$ | $\bar{R}$ | $\bar{R}$ |
| | | | | $a^2$ | $a^2$ | $a^2$ | $-1$ | | | | | | | | | $-1$ | $-1$ | $-1$ | $a$ |
| | | | | | | | | $a^2$ | $a^2$ | $-1$ | $-1$ | | | | | | | | |
| $-a$ | $a^2$ | $a^2$ | $a^2$ | | | | | | | | | $a^2$ | $-1$ | $-1$ | $-1$ | | | | |
| X | $\bar{Z}$ | $\bar{Z}$ | $\bar{Z}$ | Y | Y | Y | $\bar{X}$ | $\bar{X}$ | $\bar{X}$ | Z | Z | Z | $\bar{Y}$ | $\bar{Y}$ | $\bar{Y}$ | X | X | X | $\bar{Z}$ |

| 41 | 42 | 43 | 44 | 45 | 46 | 47 | 48 | 49 | 50 | 51 | 52 | 53 | 54 | 55 | 56 | 57 | 58 | 59 | 60 |
|----|----|----|----|----|----|----|----|----|----|----|----|----|----|----|----|----|----|----|----|
| T | T | T | T | $\bar{S}$ | $\bar{S}$ | $\bar{S}$ | $\bar{S}$ | R | R | R | R | $\bar{T}$ | $\bar{T}$ | $\bar{T}$ | $\bar{T}$ | S | S | S | S |
| | | | | | | | | $a$ | $a$ | $a$ | $-a^2$ | | | | | | | | |
| $-1$ | $-1$ | $a$ | $a$ | | | | | | | | | $a$ | $a$ | $-a^2$ | $-a^2$ | | | | |
| | | | | $-1$ | $a$ | $a$ | $a$ | | | | | | | | | $a$ | $-a^2$ | $-a^2$ | $-a^2$ |
| $\bar{Z}$ | $\bar{Z}$ | Y | Y | Y | $\bar{X}$ | $\bar{X}$ | $\bar{X}$ | Z | Z | Z | $\bar{Y}$ | $\bar{Y}$ | $\bar{Y}$ | X | X | X | $\bar{Z}$ | $\bar{Z}$ | $\bar{Z}$ |

| 61 | 62 | 63 | 64 | 65 | 66 | 67 | 68 | 69 | 70 | 71 | 72 |
|----|----|----|----|----|----|----|----|----|----|----|----|
| $\bar{R}$ | $\bar{R}$ | $\bar{R}$ | $\bar{R}$ | T | T | T | T | $\bar{S}$ | $\bar{S}$ | $\bar{S}$ | $\bar{S}$ |
| $-a^2$ | $-a^2$ | $-a^2$ | 1 | | | | | | | | |
| | | | | $-a^2$ | $-a^2$ | 1 | 1 | | | | |
| | | | | | | | | $-a^2$ | 1 | 1 | 1 |
| Y | Y | Y | $\bar{X}$ | $\bar{X}$ | $\bar{X}$ | Z | Z | Z | $\bar{Y}$ | $\bar{Y}$ | $\bar{Y}$ |

METHOD OF DETERMINING THE POSITION AND CONNECTION OF MULTI-POLE WINDINGS FOR MULTI-SPEED ELECTRIC MACHINES

This is a continuation of application Ser. No. 496,249 filed Aug. 9, 1974 and now abandoned.

This invention relates to a method of determining the position and connection of multi-pole elementary coils for electric induction machines which are operable at a number of different speeds.

There are a number of known methods of determining the grouping of the elementary coils of multi-speed rotating induction machines. The most commonly-used method hitherto consists of empirically determining the position of the coils of a multi-speed motor in order to obtain optimum efficiency by experimenting with a large number of imaginable combinations.

More recently, Professor Rawcliffe has invented a more rigorous method called "pole amplitude modulation" (P.A.M.). This method consists of modulating the amplitude of flux density in the motor air gap by a square wave having the value 1 for one half cycle and the value — 1 for the next half-cycle. The resulting flux density is only approximately sinusoidal and has to be improved by technological devices, e.g. by shortening the pitch of certain coils producing interfering waves.

There is also a known method originated by Professor Laithwaite called "phase mixing", but this method requires a very large number of winding output terminals and a large number of switches.

Finally, French Pat. No. 2,191,323 discloses connection diagrams for obtaining multi-speed electric machines having high efficiency, but the last-mentioned specification is limited to a number of special cases and does not give any general method of determination or specify how the diagrams have been obtained.

The present invention aims to provide a general method of determining the position and connections of coils for multispeed rotating electric machines so that the speeds can be switched with a minimum amount of apparatus and with maximum efficiency for each speed.

Accordingly, the present invention provides a method of determining the winding of multi-speed electric induction machines, in which the amplitude of the rotating vector representing the magnetic induction produced by the basefield winding having 2p poles is modulated by a periodic wave expressed by exp. $jq\theta$, the wave being divisible in the complex plane into $m$ complex operators denoted by $a^0, a^1, \ldots a^r, a^{m-1}$ such that $a^r = \exp. j. (2\pi r/m)$, the operators being the $m$ complex roots of unity, the value of $q$ in the expression for the wave being such that $2|p \pm q|$ is equal to the number of poles in the desired winding.

In order that the invention may be readily understood, embodiments thereof will now be described by way of example, with reference to the accompanying drawings, in which:

FIG. 30 is a phase distribution table of a 3-phase, 36 slot motor having a 4-pole base winding, useful in understanding the principles of the invention;

FIG. 31 is a phase distribution table of a 72 slot 3-phase 8/6 pole motor, useful in understanding the principles of the invention;

FIG. 32 is a phase distribution table of a 120 slot 10/8 pole 3-phase motor, useful in understanding the principles of the invention;

FIG. 33 is a phase distribution table of a 72 slot 10/8/6 pole motor, useful in understanding the principles of the invention;

FIG. 34 is a phase distribution table of a 36 slot 4/6 pole motor, useful in understanding the principles of the invention;

FIG. 35 is a phase distribution table of a 72 slot 6/8 pole motor, useful in understanding the principles of the invention.

In order to simplify the description of the method according to the invention, we shall restrict ourselves to a 3-phase voltage supply system, but of course the method of the invention can be used for designing motors operating on supply systems having any number of phases. In the rest of the description, all the embodiments will relate to 3-phase motors.

Considering the case of a 3-phase motor comprising a winding having 2p poles producing a rotating magnetic field vector in the air gap, the vector being expressed by:

$$\vec{H} = Hm \exp.j (\omega t - p\theta)$$

where $Hm$ is the modulus of the magnetic field vector, $\omega = 2\pi f$ is the angular velocity of the power supply $t$ is the time $\theta$ is the angle of the rotating vector with respect to an arbitrary origin, and $p$ is the number of pairs of poles in the motor.

Figure 1:
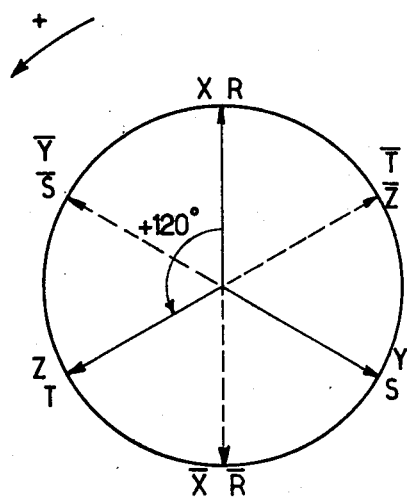
FIG. 1 shows the rotating magnetic stator (or inductor) vector of the field winding in a 3-phase supply system.

FIG. 1 represents the 3 components of the vector $\vec{H}$ in a 3-phase supply system. The transition from phase R to phase S occurs in the negative direction, which explains the minus sign in front of the term $p\theta$ in the equation for $\vec{H}$.

In accordance with the invention, a second rotating system is defined, produced by a unit vector $\vec{V}$ such that;

$$\vec{V} = \exp \pm jq\theta$$

$q$ being such that $2|p \pm q|$ is equal to the number of poles in the desired modulated winding.

Figure 2:
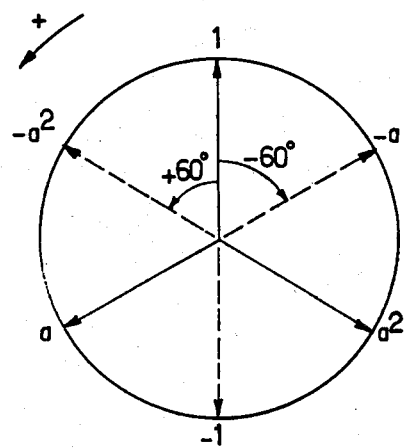
FIG. 2 represents the rotating modulating vector represented by complex operators $(1, a, a^2)$ for a modulation of order 3 and $(1, -a^2, a, -1, a^2, -a)$ for a modulation of order 6.

The vector can rotate in the positive or negative direction, the direction being arbitrarily chosen for all calculations relating to a given motor (FIG. 2).

In the case of the 3rd order modulation, we define the three components or complex operators 1, $a$ and $a^2$ of the rotating unit vector such that:

for $q\theta = 2\,k\pi \to \exp.\,j2k\pi = 1$ for $q\theta = 2\,k\pi + (2\pi/3) \to \exp.\,j(2\pi/3) = a$ for $g\theta = 2\,k\pi + \dfrac{4\pi}{3} \to \exp.\,j4\pi = a^2$ Where $k$ is any integer.

FIG. 2 shows the 3 components of the unit vector 1, $a$, $a^2$ in the case of 3rd-order modulation. If the unit vector $\vec{V}$ rotates in the chosen positive direction, we shall have the sequence of operators $(1, a, a^2)$ for each cycle of rotation, in which case the term $q\,\theta$, will be preceded by a plus sign; if $\vec{V}$ rotates in the negative direction, the negative sign will precede the term $q\theta$, and for each cycle we shall have the sequence of operators $(1, a^2, a)$.

Note that in the case of a 6th-order modulation, in accordance with the defination given previously, we shall have 6 components as follows: $1, -a^2, a, -1, a^2, -a$.

In general, in the case of a polyphase supply and $m$-order modulation, the unit rotating vector $\vec{V}$ is split up into $m$ components expressed by $m$ complex operators which are the $m$ $m^{th}$ roots of unity, i.e. $a^o, a^1, a^r \ldots a^{m-1}\,(a^o = 1)$.
with $a^r = \exp j(r.2\pi/m)$.

Note also that, in Professor Rawcliffe's method, we only have $q\,\theta = o$ or $\pi$, i.e. we have the components $+1$ or $-1$ and we cannot determine the direction in which the unit vector rotates i.e. whether we have $+q\theta$ or $-q\theta$.

In accordance with the invention, the amplitude of the rotating stator vector produced by the field winding of the motor is modulated by the unit vector, i.e. the following product is obtained:

$$\vec{H}.\vec{V} = Hm\,[\exp.j\cdot(\omega t - p\theta)]\cdot[\exp \pm jq\theta]$$
$$\vec{H}' = \vec{H}.\vec{V} = Hm\cdot \exp j[\omega t - (p \pm q)\theta] \quad (1)$$

By equation (1), vector $\vec{H}'$ is a rotating magnetic field vector which will be produced by a stator winding in which the number of poles is $2(p-q)$ if $\vec{H}$ and $\vec{V}$ have opposite directions of rotation, and the number of poles is $2(p + q)$ if the two vectors have the same direction of rotation.

In the case of 3-phase supply and 3rd order modulation, the 3 components $Hx$, $Hy$, and $Hz$ of the rotating vector $H'$ are for the case $2p2/p-q|$ poles:

$$\begin{bmatrix} H_X \\ H_Y \\ H_Z \end{bmatrix} = \begin{bmatrix} 1 & a & a^2 \\ a^2 & 1 & a \\ a & a^2 & 1 \end{bmatrix} \begin{bmatrix} H_R \\ H_S \\ H_T \end{bmatrix}$$

where
$H_R, H_S, H_T$ = components of $\vec{H}$ according to the 3 phases R, S, T.
$H_X, H_Y, H_Z$ = components of $\vec{H}'$ according to the 3 phases R, S, T.
X corresponds to phase R
Y corresponds to phase S
Z corresponds to phase T In accordance with the preceding system of equations, the modulated winding having $2|p - q|$ poles is determined from the base winding having $2p$ poles by multiplying the different phases (R S T) of the latter winding by $q$ series of complex operators $(1, a, a^2)$. Similarly, a modulated winding having $2|p + q|$ poles is determined by multiplying the different phases in the base winding by $q$ series of complex operators $(1, a^2, a)$.

$$\begin{bmatrix} H_X \\ H_Y \\ H_Z \end{bmatrix} = \begin{bmatrix} 1 & a^2 & a \\ a & 1 & a^2 \\ a^2 & a & 1 \end{bmatrix} \begin{bmatrix} H_R \\ H_S \\ H_T \end{bmatrix}$$

The order of the phases of the modulated windings is determined as follows:

Let R, S and T be the three phases of the base windings and X, Y, Z be the corresponding phases of the desired winding. Each component of the base winding is rotated, the rotation successively corresponding to each operator in the sequence of complex operators (e.g. 1, $a$, $a^2$). We then obtain a new arrangement of the phases of the desired winding components, and the new grouping of winding components is used to determine the motor connection circuit in order to obtain the desired number of poles, i.e. the new speed. This method will now be explained with reference to an example.

FIG. 30 is a Table relating to a 3-phase 36-slot motor having a 4-pole base winding, and we are trying to find a new motor connection circuit for obtaining a 6-pole winding.

In the first line of the Table, the serial numbers of the 36 coils in the base winding are given in order, from 1 to 36. The second line of the Table shows the phase distribution of each base winding component in the 36 slots. This distribution corresponds to a conventional method of winding 3-phase motors, the winding being in the present case one having 3 slots per pole and per phase.

Lines 3 to 5 of the Table show the sequence of complex operators for phases R, T and S respectively of the base winding.

The 6th line of the Table shows the phases of the modulated winding components, i.e. the phases obtained after a rotation corresponding to the complex operator in the column in question. We see for example that, in the column for slot 36 containing a base winding element having the phase T, the modulation is by operator $a$, i.e. phase T is rotated by $2\pi:13$ thus obtaining the phase corresponding to phase S, i.e. phase Y. Similarly, in the column for the 4th slot wherein the base winding element has phase $\bar{S}$, modulation is by operator 1, i.e. this phase is not rotated and has the phase $\bar{Y}$.

Accordingly, the rotation determined by the various operators shown in lines 3, 4, 5 of the Table is made, column by column for the 36 columns in the Table, thus obtaining the phase distributation of the modulated winding components shown in line 6 of the Table.

We shall now describe an example of the step of determining how the modulated winding is balanced.

First (FIG. 3) we draw a circle bearing equidistant graduation marks, successive marks being angularly spaced by an angle $$\alpha = \text{number} \frac{\pi \cdot \text{number of poles}}{\text{number of slots}}.$$

In the chosen example, referring to the Table, we have a 6-pole 36-slot motor, so that $\alpha = (\pi/6)$. Accordingly the circle has 12 marks graduated from 1 to 12, then 13 to 24, then 25 to 36. By referring to the results obtained in the Table of FIG. 30 (lines 1 and 6) we determine the coils belonging to phases X, Y, Z respectively.

The first phase (X) of the 6-pole modulated winding comprises the following coils:

6, 7, 8 corresponding to the operation (1·R)
18, 19, 20 corresponding to the operation ($a^2$T)
30, 31 32 corresponding to the operation ($a$·S)

Figure 3:
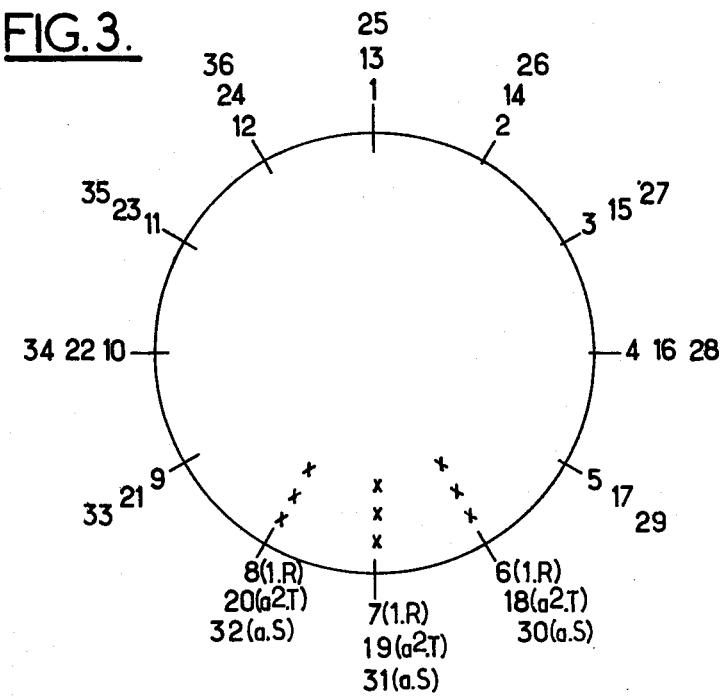
FIGS. 3 to 5 are diagrams explaining the step of balancing the modulated winding.

The resultant of the modulated winding phase X is in the direction of coils 7, 19, 31 as shown in FIG. 3.

Figure 4:
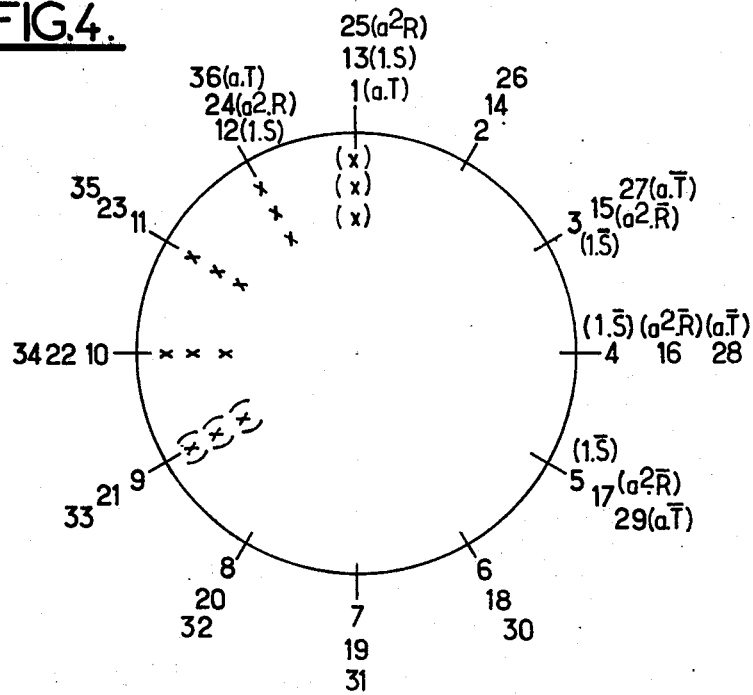

In order to obtain phase Y of the modulated winding, we draw the circle shown in FIG. 4, having 12 marks graduated from 1 to 36. We then note that the resultant of phase Y is in the direction of coils 11, 23, 35 but its amplitude is greater than the amplitude of phase X. In order, therefore, to obtain a balanced winding, we shall eliminate coils, 1, 13, 25 and 3, 15, 27 from phase Y. Phase Y thus finally comprises to the following coils: 12, 24, 36 corresponding to operations (1·S), ($a^2$R), ($a$T) respectively. 4, 16, 28 corresponding to operations (1·$\bar{S}$),($a^2\bar{R}$), ($a\bar{T}$) 5, 17, 29 corresponding to operations (1·$\bar{S}$), ($a^2\bar{R}$), ($a\bar{T}$) respectively.

Figure 5:
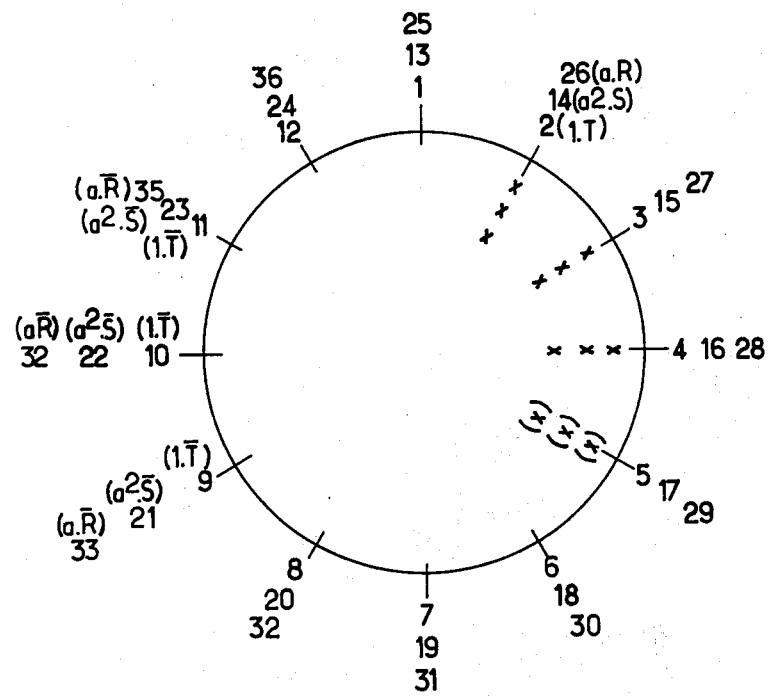

The same procedure is used to obtain the third phase Z of the 6-pole modulated winding by drawing the circle shown in FIG. 5. As before, in order to obtain perfect balance between the winding phases and a phase shift of 120°, we must eliminate windings 11, 23, 35 from phase Z. Consequently the following windings remain in phase Z: 2, 14, 26 corresponding to operations (1·T), ($a^2$·S), ($a$·R) respectively 9, 21, 33 corresponding to operations (1·$\bar{T}$), ($a^2\bar{S}$), ($a\ \bar{R}$) respectively 10, 22, 24 corresponding to operations (1·$\bar{T}$), ($a^2\bar{S}$), ($a\ \bar{R}$) respectively.

In Table of FIG. 30 the coils eliminated from the modulated winding are shown in brackets and correspond to the operators in brackets. Hereinafter, to simplify the Tables, we shall not show the eliminated coils.

We shall now, with reference to FIGS. 6 to 12, explain how the different winding components having the same phase can be grouped in a connection diagram.

We shall assume hereinafter that a winding component between an input terminal and an output terminal is represented by a vector extending in the input-output direction of the component.

FIGS. 6 to 12 show a few base component configurations out of all the possible and imaginable configurations. In each case, the letters R, X, U and W represented the input terminals whereas the letters R', X', U' and W' represent the output terminals.

Figure 6:
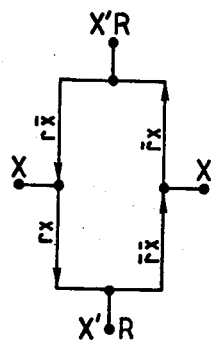
FIGS. 6 to 12 show various structures comprising base winding components for determining connection models used in the present invention.
Figure 7:
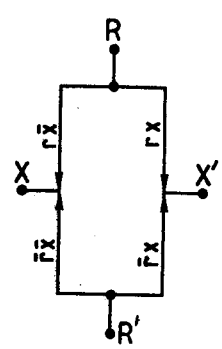
Figure 8:
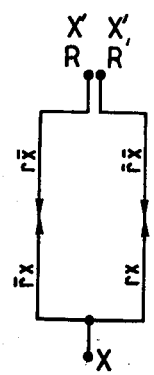
Figure 9:
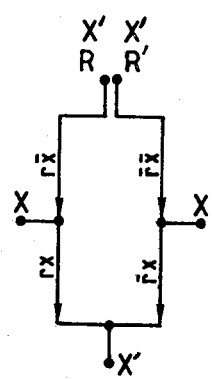
Figure 10:
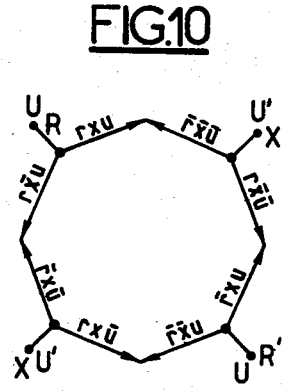
Figure 11:
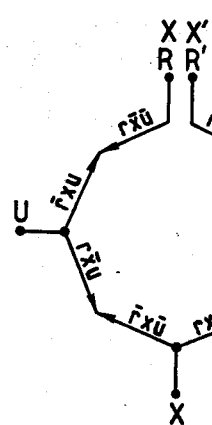
Figure 12:
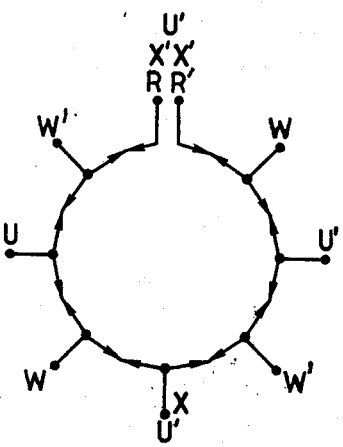
Figure 13:
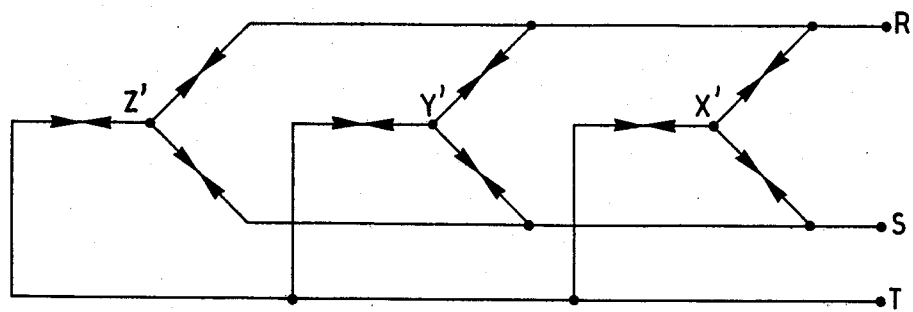
FIGS. 13 to 16 shows examples of winding diagrams applicable to the invention.

FIGS. 6 and 7 show closed polygons having four connections for winding components; FIGS. 8 and 9 show open polygons likewise having four connections for winding components, FIG. 10 shows a closed structure comprising 8 winding components, FIG. 11 shows an open structure comprising 8 winding components and FIG. 12 shows an open structure comprising 16 winding elements.

In each of FIGS. 6 to 12, the winding components are denoted by vectors which carry the current relating to the base winding (representing by the letter $r$ for the phase R input) and which also carry the current from the input relating to the modulated winding in accordance with the modulation method according to the invention. (The current from input X is denoted by $x$). In the case of polygons having 4 connections for components and having input terminals R, X, and output terminals R', X' the 4 combinations of currents in the windings are: $rx$, $\bar{r}x$, $\bar{r}\bar{x}$, $r\bar{x}$. Each of these combinations is allocated to a vector and the vectors can be disposed in a number of ways in the branches or connections of the polygons, allowing for the fact that the positive direction of the vectors corresponds to a current flowing from an input terminal to an output terminal. FIGS. 6 to 12 show some of the possible combinations of the vectors relating to the components of a motor winding.

In FIG. 6, for example, the input terminal R is at the top of the polygon, the output R' is at the bottom of the polygon, there are two inputs X at the middle of each vertical side of the polygon and two superposed outputs X' at terminals R and R'. We see that the downwardly extending vector at the top left carries the upward current coming from the left input X; it is therefore denoted by $r\bar{x}$ or R$\bar{X}$.

The other vectors are treated similarly. Subsequently, the various winding components are connected into a winding circuit having a structure characterised by the formation of 3 main stars connected in parallel as shown in FIGS. 13, 14, 15 and 16.

Figure 14:
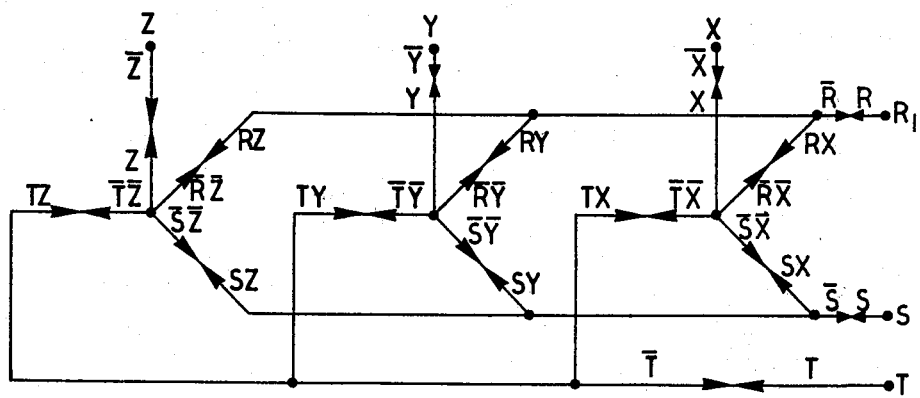

In FIG. 14, the 3 main stars are coupled in parallel and their terminals are denoted R, S, T for one speed and X, Y, Z for the other speed. The main stars can be connected in series with one or more external stars having one or more winding paths. In this kind of circuit, only the windings in the inner main stars are used for both speeds, whereas each outer star is allocated to each specific speed. Usually, the currents in the inner and outer stars are not the same, so that two different kinds of coils are required in this method of winding.

Figure 15:
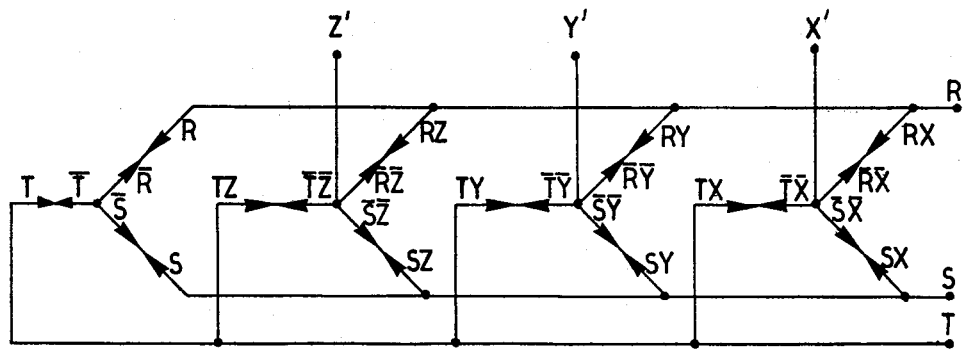

Alternatively, a connection circuit can be provided as in FIG. 15, wherein a number of stars are placed in parallel. FIG. 15 shows four stars in parallel corresponding to the case where the number of poles of one winding is a multiple of 4. In the general case where the number of poles of one winding is a multiple of a number $n$ greater than 3, the circuit comprises $n$ stars in parallel.

Figure 16:
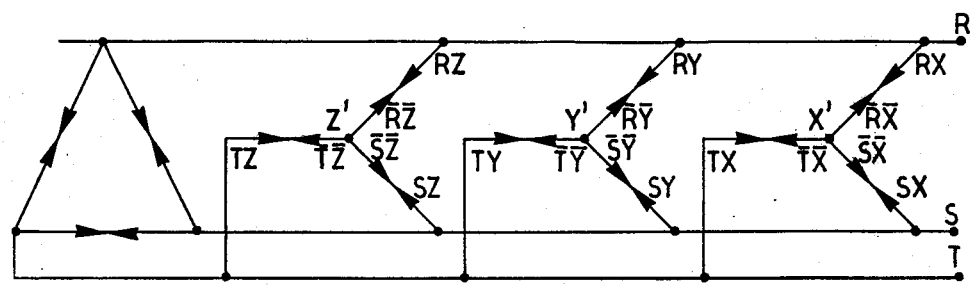

FIG. 16 shows another variant of the winding circuit, wherein 3 stars and a delta are connected in parallel for one of the winding, and wherein only 3 stars are parallel connected for the other winding.

We shall now give specific examples from which we have prepared phase distribution tables for the different winding components and for which we have shown some of the corresponding possible connection circuits.

The aforementioned Table of FIG. 30 relates to the example of a 4/6 pole, 36-slot motor.

Figure 17:
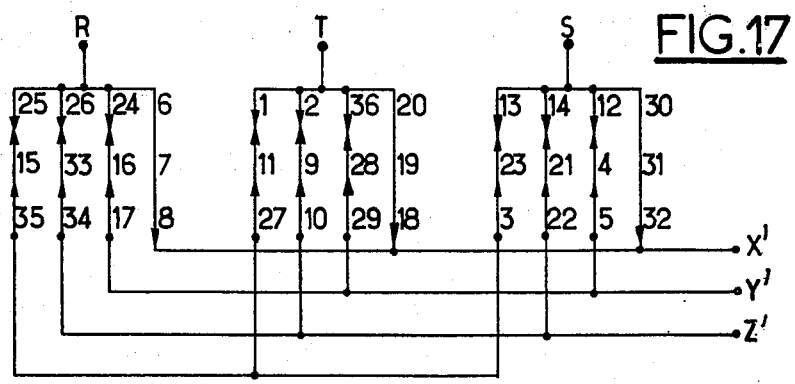
FIGS. 17 to 21 show detailed winding circuits for some of the examples described.

Starting from the results given in the Table of FIG. 30, we can prepare the winding circuit in FIG. 17, which is derived from the circuit model in FIG. 15. Circuit 17 is based on circuit 15 and obtained as follows:

We start e.g. with phase X. We find that coils 6, 7, and 8 carry currents having phase R in the case of 4 poles and phase X in the case of 6 poles, i.e. their phase states are RX and therefore their position in the circuit is the star arm RX' on the extreme left. Note that no coils are in the state $\overline{RX}$, so that the corresponding winding component will be short-circuited. Similarly, we see that coils 18, 19, and 20 in state TX and coils 30, 31, 32 in state SX are in the star arms TX' and SX' respectively which are further to the right. In the case of the star having arms which meet at the point Y', we see that the component in state RY is replaced by coil 24 and the component in state RY is replaced by coils 16 and 17, and so on.

Operation with 4 poles is obtained by supplying the motor at points R, S, T, and the operation on 6 poles is obtained by supplying the motor at points X', Y', Z'. By way of a numerical example, if the winding pitch is made diametral at 6 poles (a 6-slot pitch), the resulting winding coefficient is 0.831 for 4 poles and 0.910 for 6 poles.

Figures 31, 34:
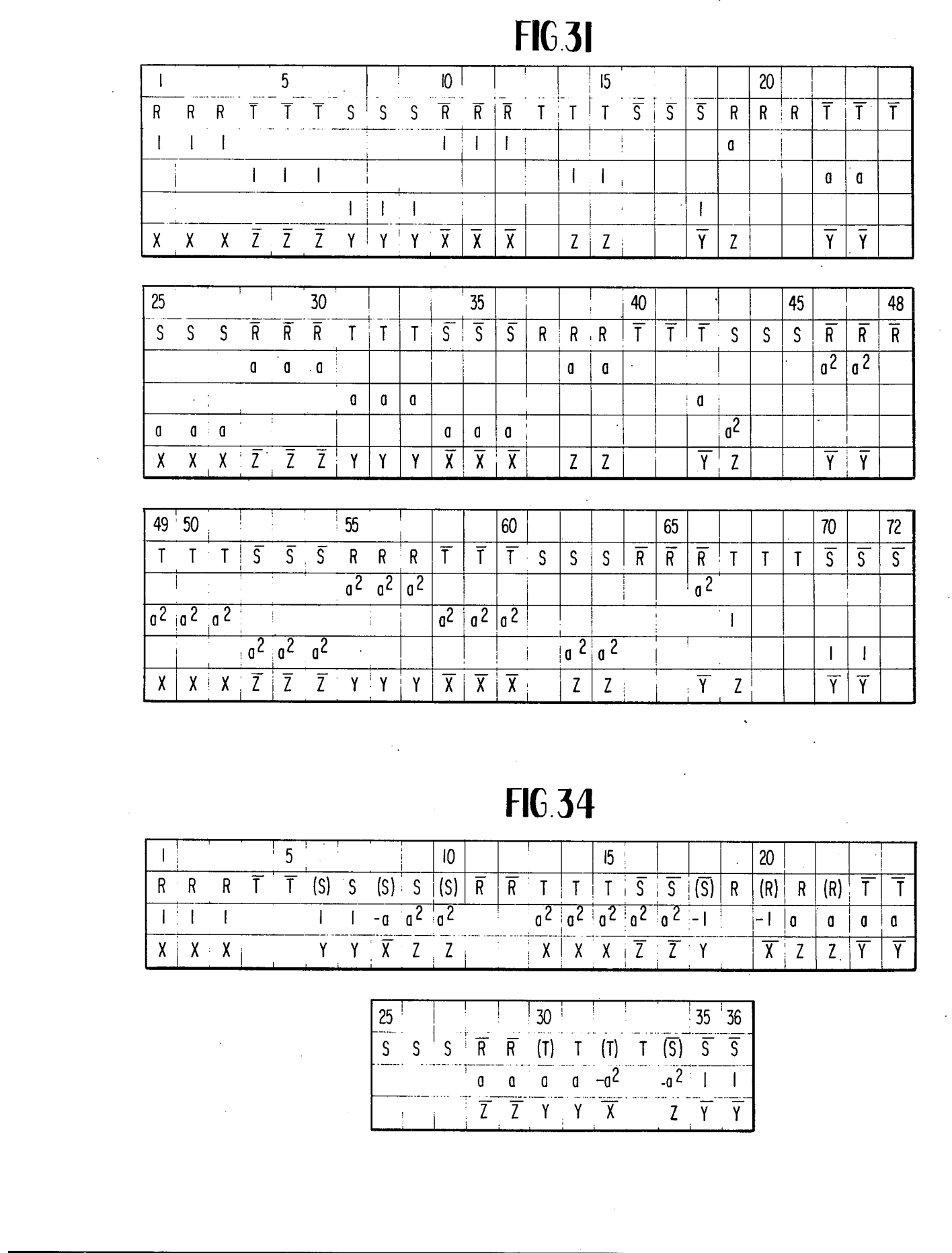

The Table of FIG. 31 relates to a 72-slot three phase 8/6 pole motor. The distribution of the coil phases is conventional, e.g. 3 slots per pole and per phase. As in the Table of FIG. 30, lines 3, 4 and 5 indicate the sequence of operators 1, $a$, $a^2$ for the base winding phases R, T, S respectively, after which the rotation operations are performed column by column, so that we can write the distribution of the winding phases for the desired modulated winding (having 6 poles) after elimination of certain coils for reasons of symmetry, as already explained.

Figure 18:
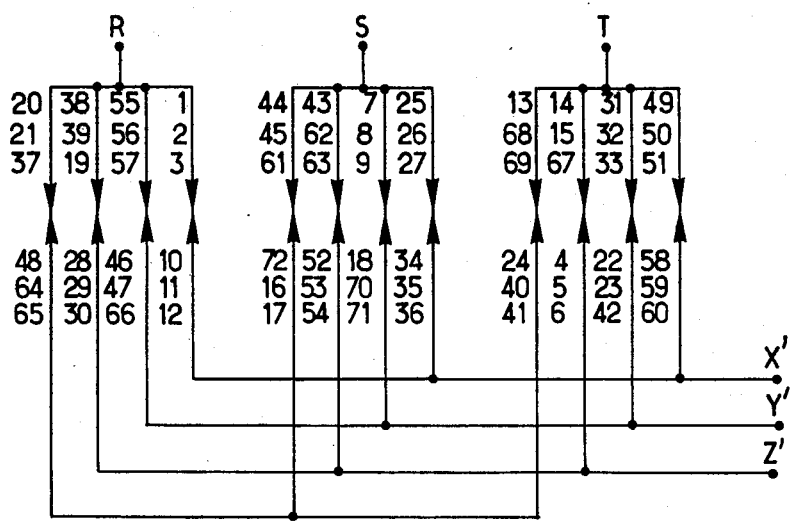

FIG. 18 is an 8/6 pole winding diagram corresponding to the Table of FIG. 31, based on the circuit in FIG. 15.

Figure 19:
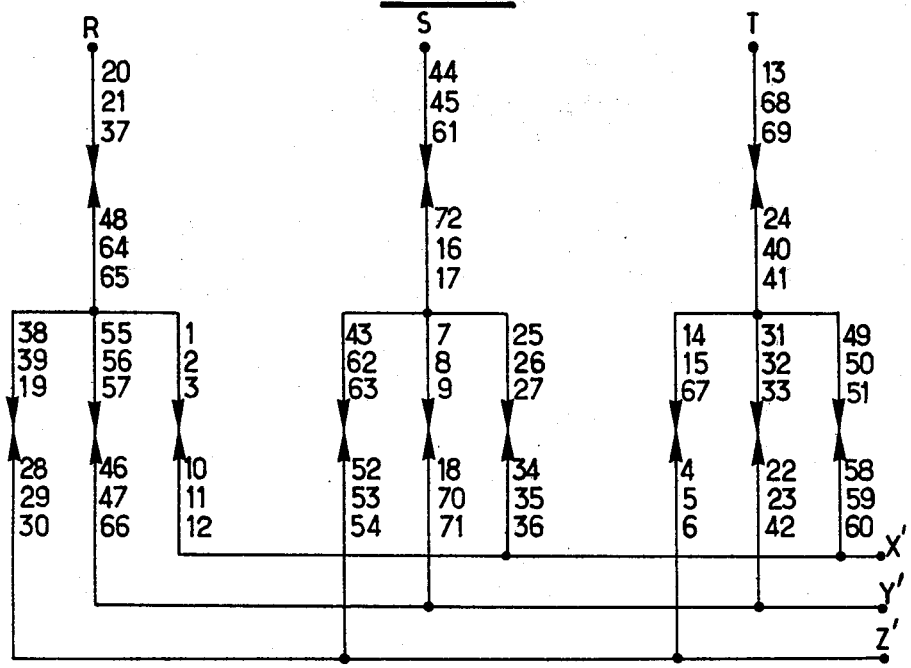

FIG. 19 shows another variant of the 8/6 pole winding circuit corresponding to the Table of FIG. 31 and based on the circuit in FIG. 14.

In both cases, R, S, T are supplied for 8 poles, and X', Y', and Z' are supplied for 6 poles.

Figure 32:
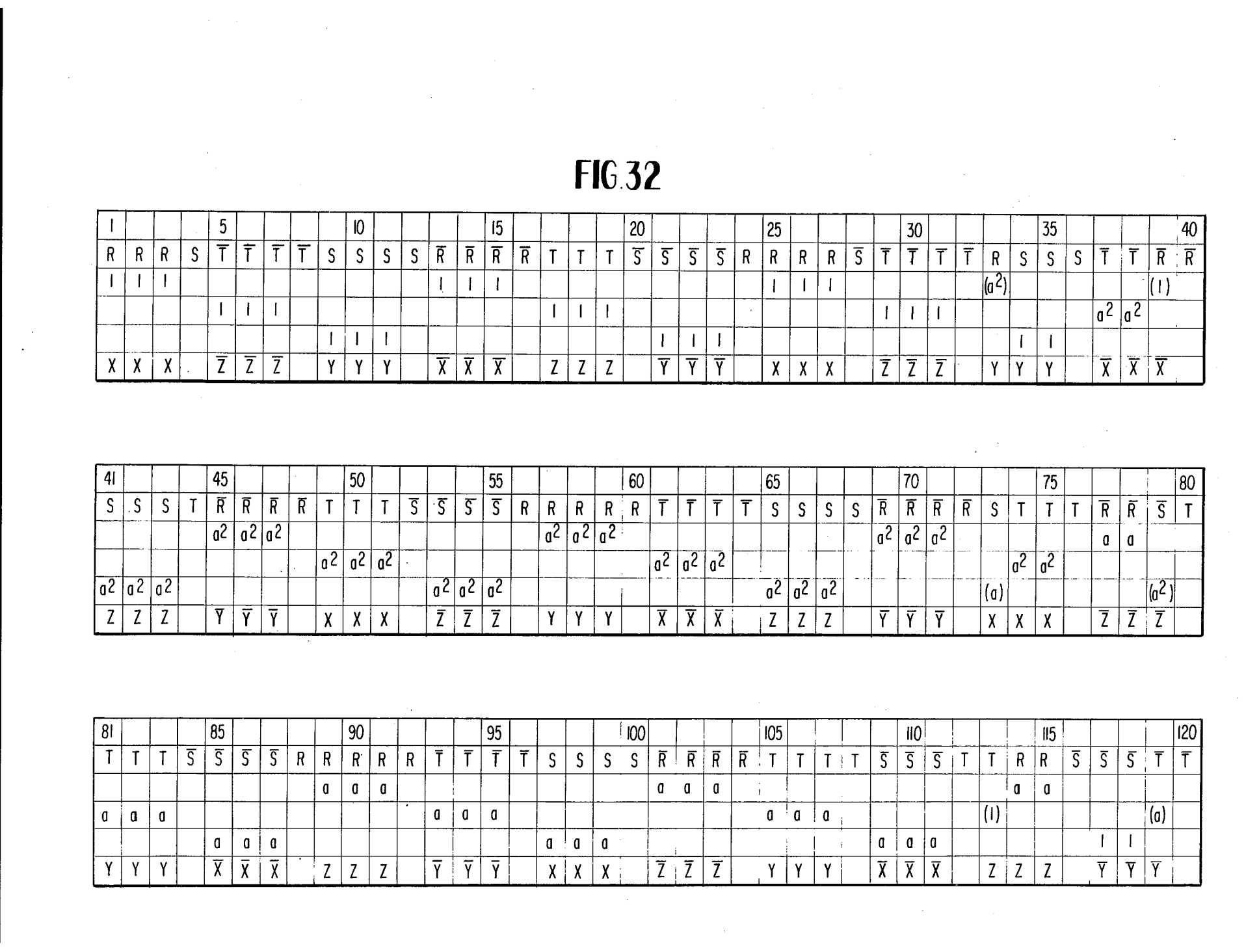

The Table of FIG. 32 is an example of a 120-slot 10/8 pole 3-phase motor.

The base winding is an 8-pole irregular winding, the phase distribution of which is shown at line 2. The sequence of operators 1, $a^2$, $a$ relating to phase R, T, S are shown at lines 3, 4, and 5 respectively; finally at the bottom line we obtain the phase distribution of the coils in the 10-pole winding, which is a regular distribution of 3 slots per pole and per phase.

Figure 20:
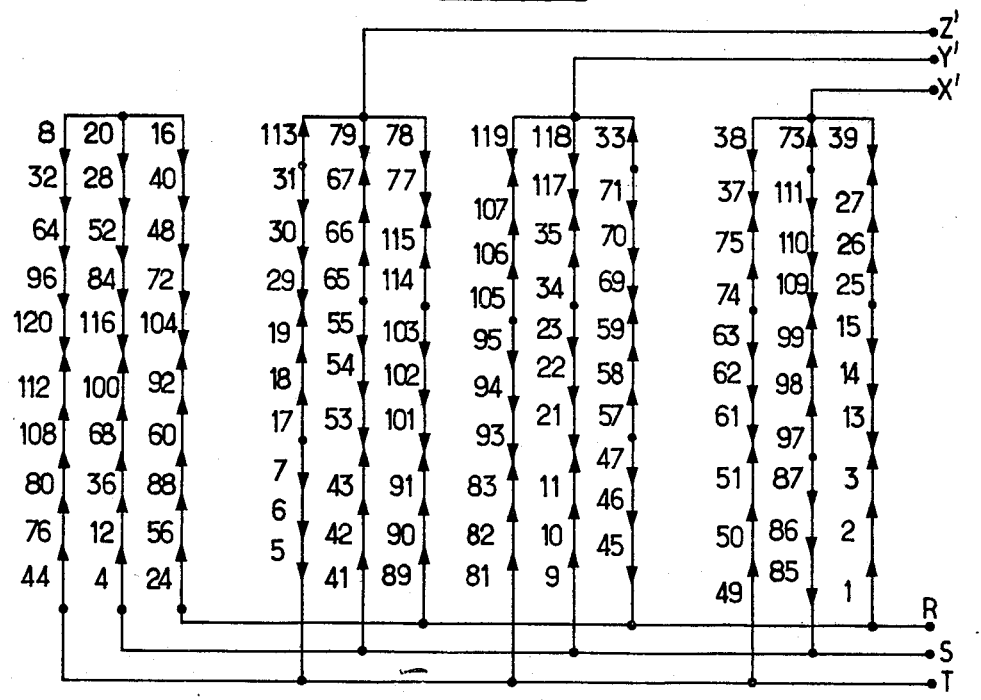

FIG. 20 gives the corresponding winding circuit based on the circuit structure in FIG. 15.

Figure 21:
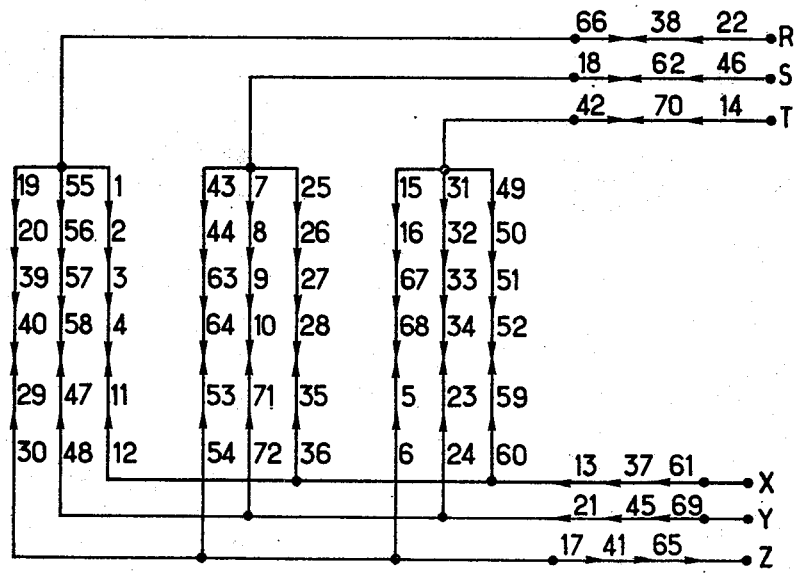

The Table of FIG. 33 relates to a 72-slot 10/8/6 pole motor. In the case where Table the relates to an 8/6 pole motor, we can derive the detailed circuit of FIG. 21, which relates to a model similar to that in FIG. 14.

Figure 22:
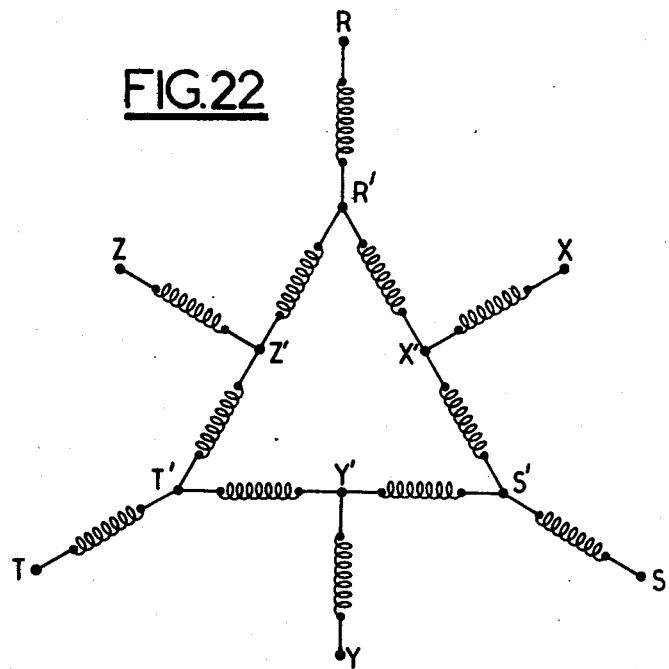
FIGS. 22 to 24 show other kinds of possible winding circuits applicable to the invention.
Figure 25:
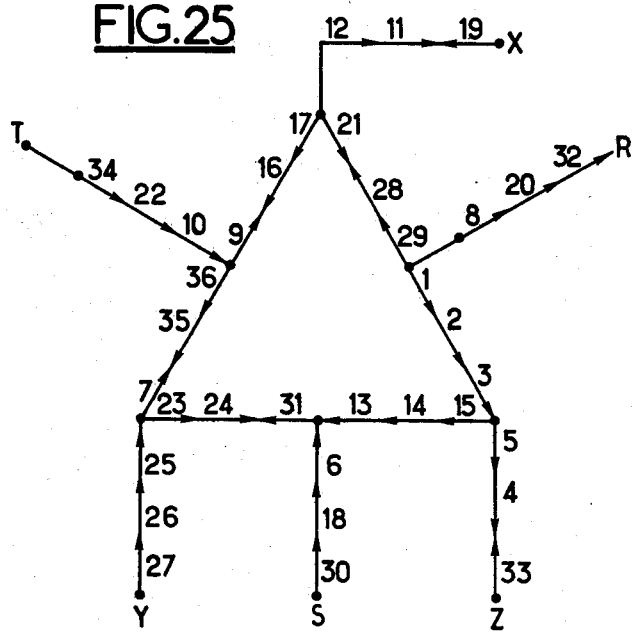
FIG. 25 is an example of a detailed winding diagram.
Figure 23:
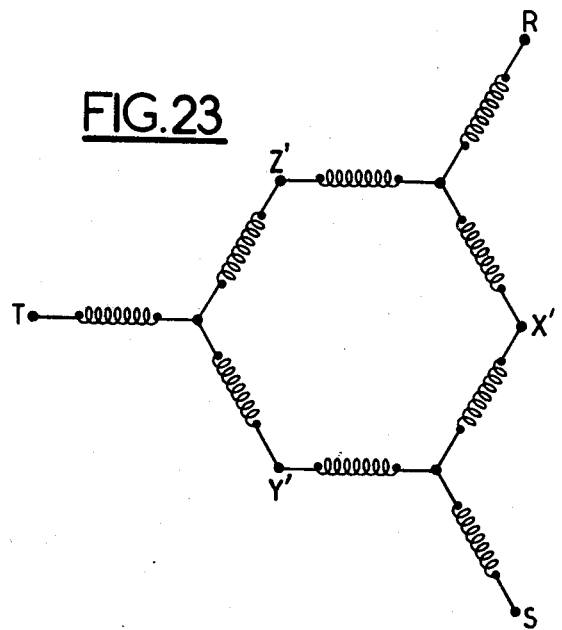
Figure 24:
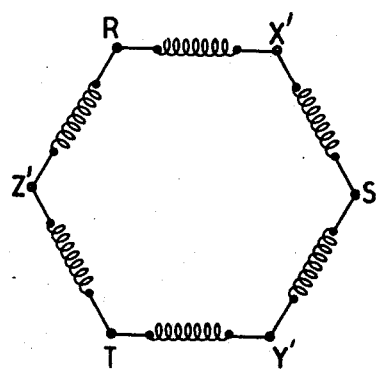

The Table of FIG. 34 relates to a 36-slot 4/6 pole motor wherein the sequence of operators (1, $-a$, $a^2$, $-1$ $a$, $-a^2$) is used for modulation (6th-order modulation). In this Table, we can derive a winding circuit as in the model in FIG. 13 or FIG. 14, but we may also adopt a different circuit model, e.g. that in FIG. 22, which is a delta circuit model which may or may not be in series with the outer stars like the aforementioned other circuits, and requires only 6 outputs and 2 contactors for switching the poles. The variant in FIG. 23 is obtained by omitting one star and the variant in FIG. 24 is obtained by omitting two stars. The detailed connection diagram derived from the Table 34 is shown in FIG. 25 and resembles the model in FIG. 22.

The Table of FIG. 35 relates to a 72-slot 6/8 pole motor for which the sequence of operators (1, $-a$, $a^2$, $-1$, $a$, $-a^2$) is used (6th-order modulation.)

The base winding has 4 slots per pole per phase (6 poles) and modulation gives an 9-pole winding having 3 slots per pole and per phase. The winding diagram derived from Table 6 is represented either by FIG. 28 or FIG. 29.

Figure 26:
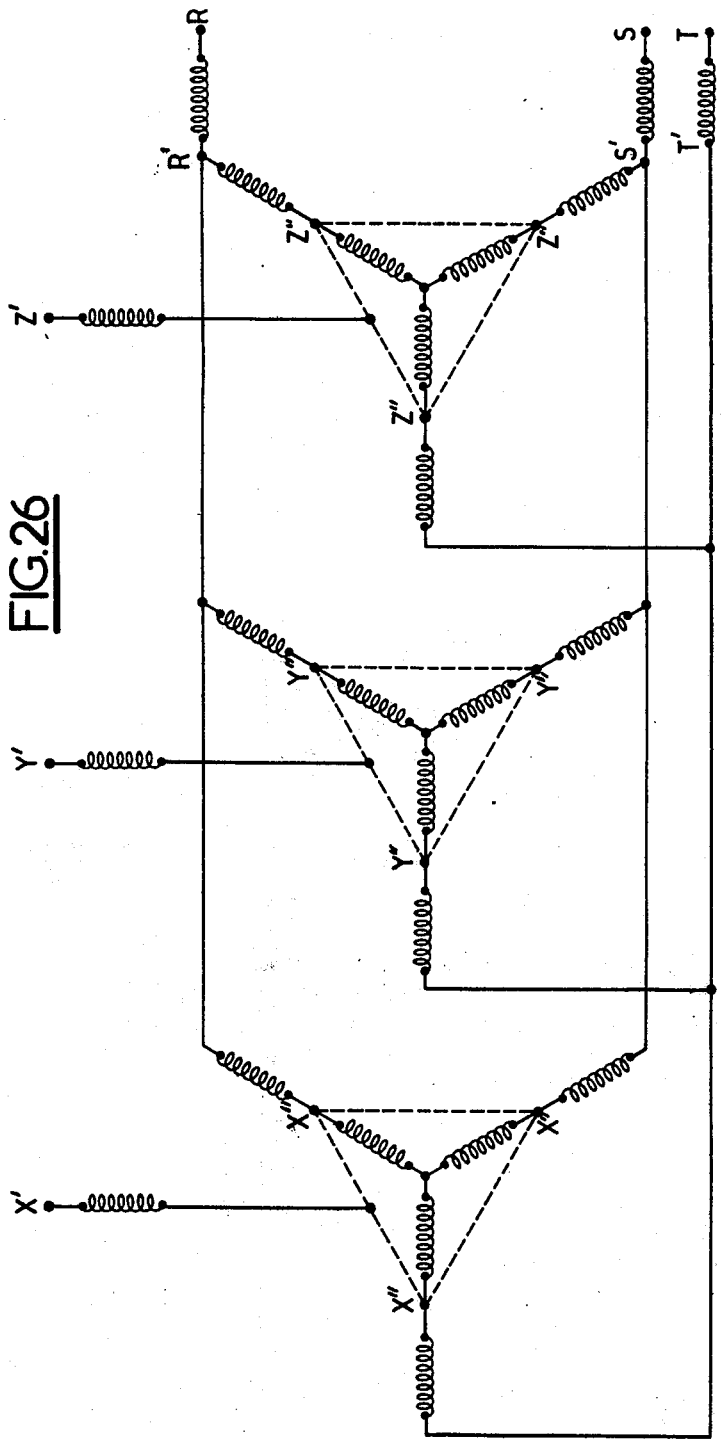
FIGS. 26 to 27 are examples of winding diagrams in the case of 6-order modulation.
Figure 27:
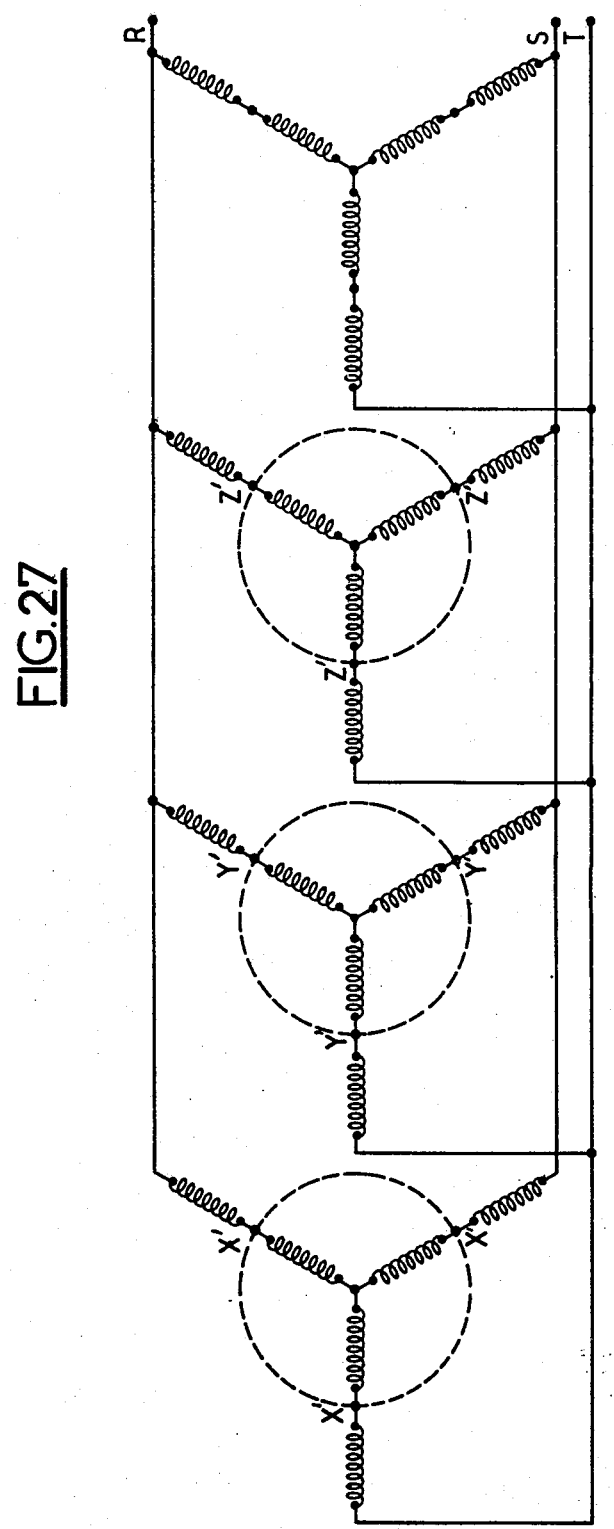
Figure 28:
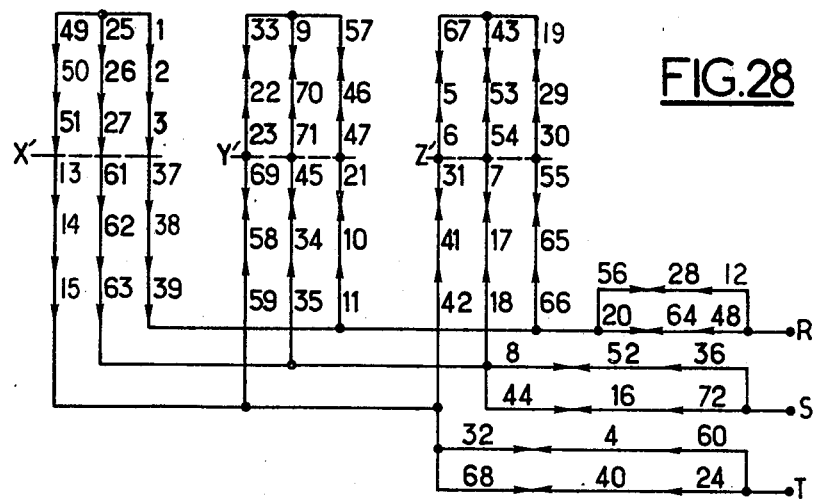
FIGS. 28 to 29 are examples of practical winding diagrams.
Figure 29:
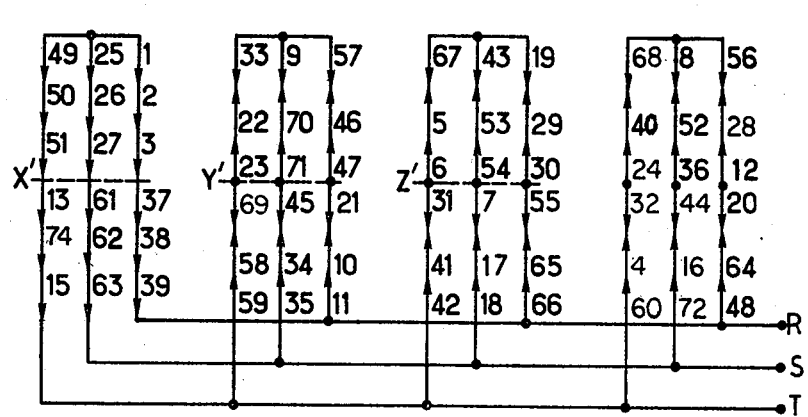

FIG. 28 shows the circuit for a 72-slot 6/8 pole motor based on the model in FIG. 26 and derived from Table of FIG. 35. FIG. 29 shows another circuit comprising a number of stars in parallel, based on the model in FIG. 27. The last-mentioned circuits are less advantageous than the preceeding ones, since they require more outputs and more complex switching means.

I claim:

1. A method of modifying a one-speed machine, wherein the elementary coils are arranged to provide a $2p$ pole machine, into a two-speed machine having $2|p \pm q|$ poles at the other speed, and having an optimum efficiency at both speeds, using only two 3-phased switches, comprising the steps of:

choosing a base winding wherein the elementary coils are arranged to provide a $2p$ pole machine;

dividing the length of the base winding along the air gap into $6q$ sectors;

bringing the middle of any one of said $6q$ sectors into the best coincidence possible with the middle of any one of the poles of any phase of said $2p$ pole winding and denoting this sector as the first sector;

choosing an arbitrary positive direction for the pole and sector series:

referencing the elementary coils of said first sector for connection to the same phase in the $2p$ pole configuration as in the $2|p \pm q|$ pole configuration;

assigning sector designations 2 to 6 to the sectors following said first sector in the positive direction, and referencing the elementary coils of sectors 2 to 6 for connection in phases which are shifted respectively for sectors 2 to 6 by ($\pi/6$), ($2\pi/6$), ($3\pi/6$), ($4\pi$,6), ($5\pi/6$) with respect to the phase feeding them in the $2p$ pole configuration in the case of the $2|p - q|$ pole configuration, and in phases which are shifted respectively for sectors 2 to 6 by $-\pi/6$, ($-2\pi/6$,) $-3\pi/6$, $-4\pi/6$, $-5\pi/6$, with respect to the phase feeding them in the case of the $2|p + q|$ pole configuration;

referencing the elementary coils for each of the $q$ successive groups of 6 sectors for connection the same as is recited above; in the $2|p \pm q|$ pole winding thus determined, eliminating the elementary coils which are detrimental to the winding symmetry, whereby a winding is obtained which has 3 phases which are mutually phase-shifted by exactly 120° and which each comprise the same number of elementary coils;

connecting all of the elementary coils remaining after said elimination of said coils detrimental to winding symmetry in a circuit comprising three parallel stars, the ends of which are supplied through a first three-phase switch by three corresponding phases of the power supply source for operation at one of said speeds when said first switch is activated, the middle points of the star arms being respectively short-circuited for each phase and supplied through a second three-phase switch by three corresponding phases of said power supply source for operation at the other of said speeds when said second switch is activated.

2. A method according to claim 1, further comprising connecting all said eliminated elementary coils between said first 3-phase switch and said ends of the stars.

3. A method according to claim 1, further comprising connecting all said eliminated elementary coils are connected between said second 3-phase switch and said middle points of the star arms.

4. A method of modifying a one-speed machine wherein the elementary coils are arranged to provide a $2p$ pole machine into a two-speed machine having $2(p \pm q)$ poles at the other speed, and having an optimum efficiency at both speeds, using only two 3-phased switches, comprising the steps of:

dividing the length of the base winding of said $2p$ pole machine along the air gap into $3q$ sectors;

bringing the middle of any one of said $3q$ sectors into the best coincidence possible with the middle of any one of the poles of any phase of said $2p$ pole winding and denoting this sector as the first sector;

choosing an arbitrary positive direction for the pole and sector series;

referencing the elementary coils of said first sector for connection to the same phase in the $2p$ pole configuration as in the $2|p \pm q|$ pole configuration;

referencing the elementary coils of the second sector taken in said positive direction for connection in the $2|p - q|$ configuration, to a phase which is shifted by $+2\pi/3$ with respect to the phase feeding them in the $2p$ pole configuration, or for connection in the $2|p + q|$ pole configuration, to a phase which is shifted by $-2\pi/3$ with respect to the phase feeding them in the $2p$ pole configuration;

referencing the elementary coils of the third sector taken in said positive direction for connection in the $2|p - q|$ pole configuration, to a phase which is shifted by $+4\pi/3$ with respect to the phase feeding them in the $2p$ pole configuration, or for connection in the $2|p + q|$ pole configuration, to a phase which is shifted by $-4\pi/3$ with respect to the phase feeding them in the $2p$ pole configuration;

referencing the elementary coils for each of the $q$ successive groups of 3 sectors for connection the same as is recited above; in the $2|p \pm q|$ pole winding thus determined, eliminating the elementary coils which are detrimental to the winding symmetry, whereby a winding is obtained which has 3 phases which are mutually phase-shifted by exactly 120° and which each comprise the same number of elementary coils;

connecting all of the elementary coils remaining after said elimination of said coils detrimental to winding symmetry in a circuit comprising three parallel stars, the ends of which are supplied through a first 3 phase switch by the three corresponding phases of the power supply source for operation at one of said speeds when said first switch is activated, the node points of said three stars being supplied through a second 3 phase switch by the three corresponding phases of said power supply source, for operation at the other of said speeds when said second switch is activated.

5. A method according to claim 4, further comprising connecting all said eliminated elementary coils between said first 3-phase switch and said ends of the stars.

6. A method according to claim 4, further comprising connecting all said eliminated elementary coils between said second 3-phase switch and said node points of the stars.

7. A method accoridng to claim 4, further comprising connecting one half of said eliminated elementary coils between said first 3-phase switch and said ends of the stars, and connecting the other half of said eliminated elementary coils between said second 3-phase switch and said node points of the stars.

* * * * *